(No Model.) 2 Sheets—Sheet 1.
J. C. BEST & G. W. ANDERSON.
METHOD OF AND APPARATUS FOR TREATING YUCCA FIBER.
No. 467,493. Patented Jan. 26, 1892.
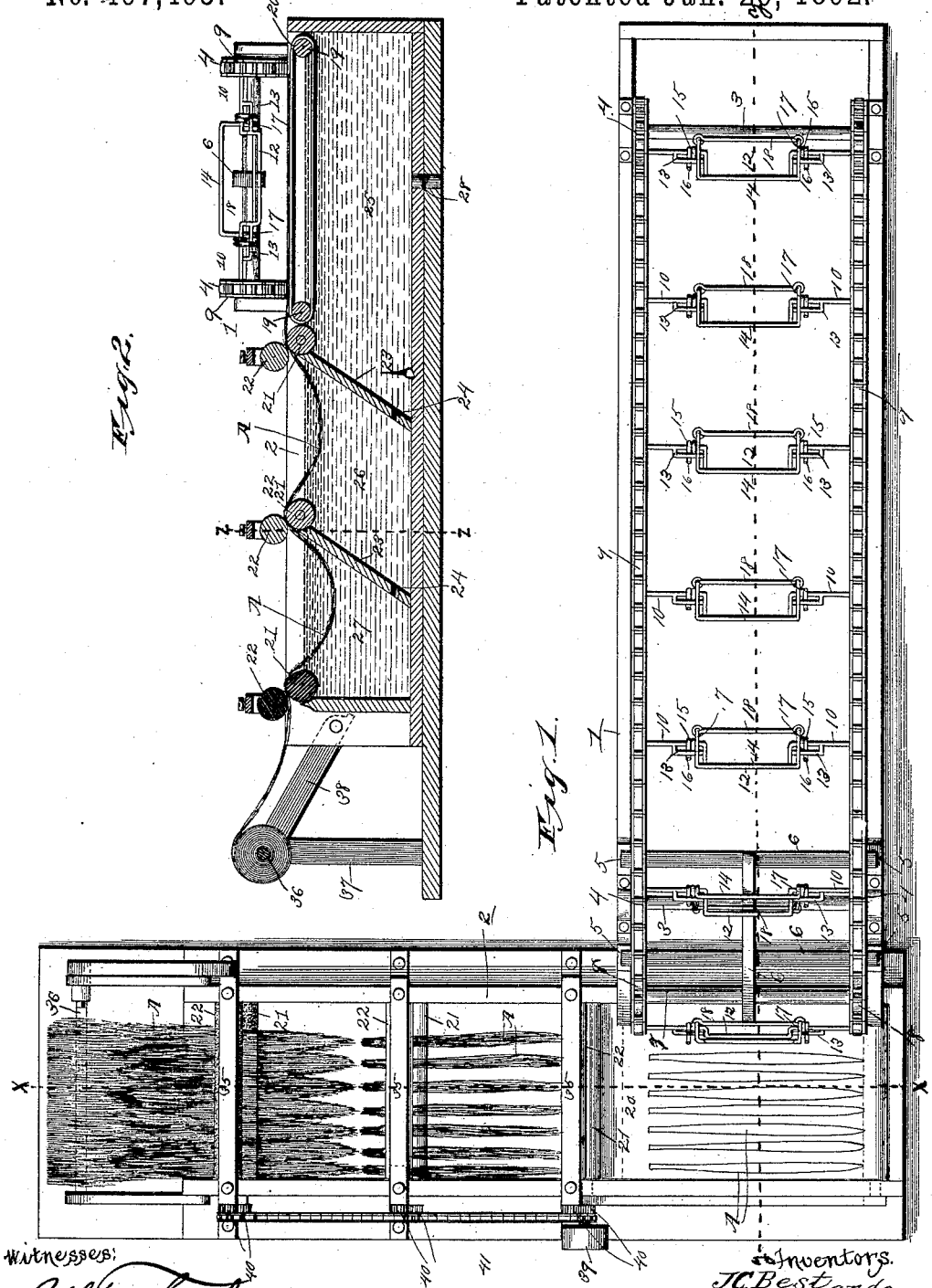
Witnesses:
Inventors.
J. C. Best, and
G. W. Anderson
By Higdon & Higdon
Attorneys.

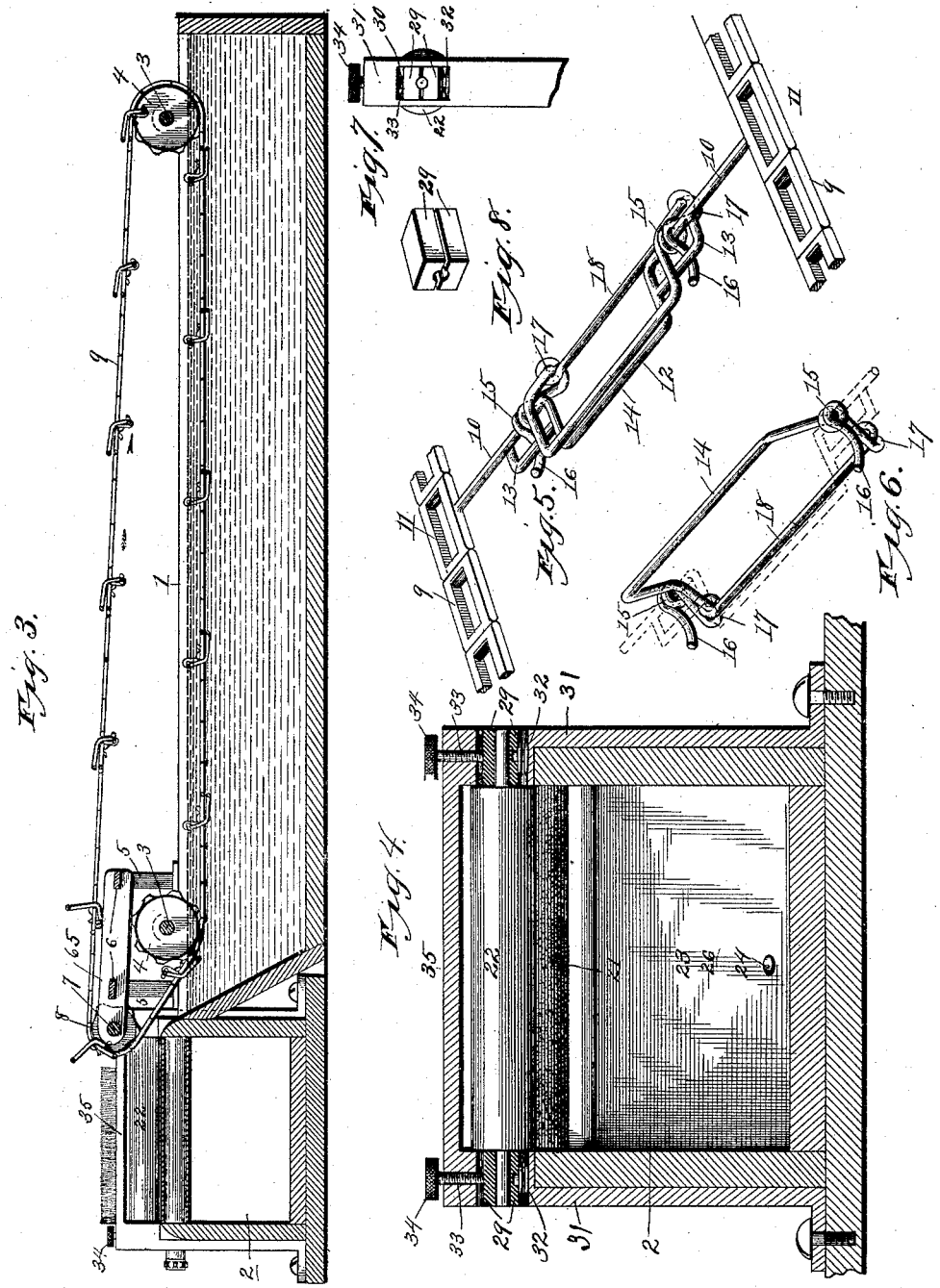

UNITED STATES PATENT OFFICE.

JOHN C. BEST AND GEORGE W. ANDERSON, OF RAYTOWN, MISSOURI.

METHOD OF AND APPARATUS FOR TREATING YUCCA FIBER.

SPECIFICATION forming part of Letters Patent No. 467,493, dated January 26, 1892.

Application filed March 20, 1891. Serial No. 385,750. (No model.)

*To all whom it may concern:*

Be it known that we, JOHN C. BEST and GEORGE W. ANDERSON, of Raytown, Jackson county, Missouri, have invented certain new and useful Improvements in Methods of and Apparatus for Treating Yucca Fiber, of which the following is a full, clear, and exact description, reference being had to the accompanying drawings, forming a part hereof.

Our invention relates to the treatment of the leaves of the yucca or Spanish bayonet; and the objects of our invention are, first, to provide a simple and inexpensive method whereby the internal fibers of said plant can be readily separated from the outer skin or sheath and be rendered useful for the production of binder-twine, cordage, ropes, and similar articles; secondly, to produce simple and inexpensive mechanism for effectually carrying out the said method, and, finally, to produce a novel and superior material for the construction of the binder-twine, rope, and similar articles, as above stated.

To the above purpose our invention consists in the peculiar and novel method of treatment hereinafter described and claimed; secondly, in the peculiar and novel features of construction and arrangement of parts, as also hereinafter described and claimed.

In order that our invention may be fully understood, we will proceed to describe it with reference to the accompanying drawings, in which—

Figure 1 is a plan view of our complete mechanism for treating the leaves and fibers. Fig. 2 is a central longitudinal section of the cold-water mechanism on the line $x\ x$ of Fig. 1. Fig. 3 is a central vertical longitudinal section of the hot-water mechanism on the line $y\ y$ of Fig. 1. Fig. 4 is a transverse vertical section of the cold-water mechanism in the line $z\ z$ of Fig. 2. Fig. 5 is a detached perspective view of a portion of the feeding mechanism for the hot-water bath, one of the clamps being shown in closed condition. Fig. 6 is a detached perspective view of one of the clamps in open condition. Fig. 7 is a detached view in side elevation of one of the adjustable bearings for the cold-water rolls. Fig. 8 is a detached perspective view of the bearing-blocks for said rolls.

The filamentous plant known as the "yucca" or "Spanish bayonet," also as the "bear-grass" and "soap-weed," is that upon which our improved method and apparatus is designed to operate. The leaves of this plant are elongated in form and are pointed at their outer ends. The leaves have also a thick dark-green skin or epidermis, while the interior or body of the leaves is composed of numerous fibers, which extend lengthwise of the leaf, and which, as we have discovered, possess great strength. As these fibers extend lengthwise of the leaf, they possess, in addition to the valuable quality of strength, above mentioned, also the important quality of length, and we have discovered that if these fibers be properly separated from the outer skin or epidermis of the leaves they will, when properly twisted into strands, form very strong and durable cord or rope and particularly binder-twine. After careful experiment we have discovered the following method by which the said fibers can be readily separated from the skin or epidermis. We first take the leaves and subject them to a bath in hot water or other suitable liquid at a high temperature, continuing this treatment until the outer skin or epidermis becomes well softened and the cellular tissues of the leaves also become thoroughly dissolved or broken down. As the next step of our improved method we subject the leaves to the action of rollers and simultaneously to a washing with cold water or other suitable liquid. This rolling and washing of the leaves entirely removes the skin or epidermis, as well as the cellular structure of the leaf, and leaves the interior fibers each completely separated from the other and in perfectly strong and sound condition. After having been properly dried the fibers are immediately ready to be twisted to form cord, rope, binder-twine, and similar articles, and may be so worked, either in their natural condition or after having been suitably dyed, as desired.

In order to efficiently carry out the above method, we employ certain mechanical devices, which we will now proceed to describe.

In the accompanying drawings, 1 designates an elongated tank or receptacle for containing hot water or other liquid, and 2 a similar tank or receptacle for containing cold water or similar liquid. Upon the opposite ends of tank 1 are mounted two shafts 3, extending horizontally across the tank and each carrying at each end a suitable sprocket-wheel 4. Upon one end of the tank 1 is also mounted a frame-work composed of uprights 5 at each side of the tank, connected by horizontal cross-pieces 6, extending across the tank at each side and by cross-pieces 65, extending lengthwise the tank. A shaft 7 is journaled horizontally in the outer ends of the cross-pieces 6, and at each end said shaft carries a suitable sprocket-wheel 8. It will thus be seen that the sprocket-wheels 4 occupy the same level, while the sprocket-wheels 8 are mounted in a higher plane than the sprocket-wheels 4. Around the sprocket-wheels 4 and 8, at each side of the tank, runs a suitable drive-chain composed of any desired number of links 9. At suitable intervals the two sprocket-chains carry transverse grippers or carriers for immersing the leaves in the hot liquid, and these grippers are constructed as follows: A number of bars 10 are each connected at its opposite ends to two opposite links 11, and midway of its length said bar is bent or otherwise formed U-shaped, as shown at 12. Each bar 10 carries two L-shaped arms 13, the inner ends of which are united to the ends of the U-shaped portion 12, and the outer ends of which are united to the end portions of the bars 10 adjacent to said U-shaped portions. Each of these bars carries a movable spring jaw or clamp 14, each of which is of U form and each arm of which is bent into a loop 15, which embraces the ends of the bars 10 within the arms 13 thereof, and the extremities 16 of which lie beneath said arms 13. Before being bent into the loops 15 the arms of the clamps are bent upon themselves, as shown at 17, and these bends are embraced by the ends of a cross-bar 18. The spring action of the jaws tends to retain them in closed position, and there are any suitable number of these clamps provided for the sprocket-chains, as preferred. These sprocket-chains move in the direction indicated by the arrow in Fig. 3, and the lower strands of the chains are submerged in the hot liquid in tank 1. As the clamps move forward and upward beneath the middle bar 65 the cross-bars 18 engage the end of the middle bar, and thus throw the jaws open, as shown in Figs. 3 and 6. As the clamps move backward the cross-bars 18 remain in engagement with the upper side of the middle bar 6, and thus the clamps are held open to receive the leaves. An attendant lays several of the leaves A in each jaw in such manner that the leaves extend transversely of the tank, and as soon as the jaws pass backward beyond the bar 6 they automatically close and firmly grasp the leaves. Passing over the rear sprocket-wheels 3 the clamps are submerged in the hot liquid, and consequently submerge the leaves A therein, (see Fig. 3,) and the leaves are carried slowly forward through the liquid until their outer skin or epidermis is thoroughly softened and the inner cellular structure is thoroughly broken down. As soon as the clamps reach the front end of the tank 1 they move upwardly out of the liquid, and the cross-rods 18 of the clamps, striking the front end of the bar 6, open the clamps and allow the leaves A to fall therefrom.

In the front end of the cold-liquid tank 2 are mounted two horizontal rollers 19, which extend transversely of the said tank and over which runs an endless apron 20, preferably of rubber. The lower strand of said apron is submerged in the cold liquid, as shown in Fig. 2, and the leaves drop lengthwise upon said apron from the clamps 14, above described, as shown in Fig. 1. At intervals in the tank 2 are placed partitions 23, which are inclined upwardly toward the front end of the tank and each of which is formed in its lower portion with an opening 24. A number of compartments 25, 26, and 27 are thus provided for the tank, and the cold liquid flows from the rear compartment 27 through the openings of the partitions toward the front end of the tank and is finally discharged through an outlet 28 in the bottom of the front compartment. The upper edges of the partition 23 are beveled off at their front sides and a number of lower horizontal rollers 21 are so mounted in the sides of the tank and lie closely adjacent to these beveled edges. Immediately above each roller 21 is mounted a companion roller 22, the ends of which are journaled between bearing-blocks 29, set movably in an opening 30 in the upper end of each of a number of uprights 31 at each side of the tank. The lower blocks 29 rest upon the springs 32, mounted in the bottoms of the openings 30, while the upper blocks 29 are impinged upon by the lower ends of the screw-stems 33, having each a hand-wheel 34 at its upper end. It will thus be seen that by turning the hand-wheels 34 in one or the opposite direction the upper roller can be made to exert greater or less pressure upon the lower rollers, as desired. The opposite uprights 31 are preferably connected together by cross-bars 35 for the sake of additional strength. The two rollers at the discharge end of the tank are preferably of rubber composition, and the lower rollers of all of the sets are partially submerged in the cold liquid in the tank. A drum or roll 36 is mounted horizontally at the discharge end of the tank and its ends are journaled in the meeting ends of supports 37 38, as shown. One of the upper rollers 22 carries at one end a belt-pulley 39, through which power is transmitted to the rollers, and each pair of rollers has at its adjacent end gear-wheels 40 intermeshing with each other. A suitable drive chain or belt passes over the ends of the upper front and rear rollers and also over the ends of the intermediate rollers, and thus rotates the same. Now as the leaves A fall upon the apron 20 they are arranged parallel with each other and longitudinally of the machine by an attendant and they are caught by the first pair of rollers and pass successively through all of the rollers. The rollers take off the outer skin or epidermis of the leaves and also separate the cellular structure from the internal fibers, this action being aided by the fact that the leaves dip into the cold liquid between each pair of rollers. It will be seen by reference to Fig. 2 that as the leaves pass successively from the compartment 25 to the compartment 26 and then to the compartment 27, and finally out of the latter, the softened epidermis and cellular structure will be gradually and finally thoroughly removed from the fibers. In the compartment 26 most of this epidermis and cellular structure will be removed, and the remainder of such material will be entirely removed in the last compartment 27, and this result is assured by the fact that the current of water flows oppositely from the direction of movement of the leaves, so that the last immersion of the leaves is in the cleanest water. It is obvious, of course, that any desired number of these compartments with their corresponding partitions and rollers 21 and 22 may be employed. Thus when the leaves A pass through the last pair of rollers nothing is left but the fibers, which are then wound upon the drum or roll 36, and are ready for twisting into cord, rope, or binder-twine, as described.

From the above description it will be seen that we have devised a very simple and effective method and apparatus for separating the fibers from the leaves of the yucca plant or Spanish bayonet, and that the fibers so separated are caused to retain all of their natural strength and durability.

Having thus described our invention, what we claim as new, and desire to secure by Letters Patent, is—

1. An improved method of treating yucca fibers, the same consisting in subjecting the leaves to the action of a hot-liquid bath for softening the external skin or epidermis and breaking down the internal cellular structure of the leaves, and then subjecting the leaves so treated to the alternate action of pressure and cold-liquid washings to separate the softened skin or epidermis and the disintegrated cellular structure from the fibers, substantially as set forth.

2. An improved apparatus for treating yucca fibers, comprising a tank or receptacle for hot liquid, and an endless conveyer for submerging the leaves in said liquid, and a number of spring-clamps carried by said conveyer and serving to receive and carry the leaves, substantially as set forth.

3. An improved apparatus for treating yucca fibers, comprising a tank or receptacle for hot liquid, an endless conveyer for submerging the leaves in said liquid, a number of spring-clamps carried by said conveyer and serving to receive and deliver the leaves, and a trip-bar located at the discharge end of the tank and serving to open the clamps, substantially as and for the purpose set forth.

4. An improved apparatus for treating yucca fibers, comprising a tank or receptacle for hot liquid, a pair of endless sprocket-chains movable longitudinally thereof, and a number of spring-clamps carried by said chains, each composed of a U-shaped cross-bar connected at its ends to suitable links and a spring-jaw embracing the ends of said cross-bar and pivotally movable thereon, substantially as set forth.

5. An improved apparatus for treating yucca fibers, comprising a tank or receptacle for cold liquid, a number of rollers mounted adjustably on said tank, and a roll or drum also mounted on said tank and serving to receive the fibers, substantially as set forth.

In testimony whereof we affix our signatures in presence of two witnesses.

JOHN C. BEST.
GEORGE W. ANDERSON.

Witnesses:
G. Y. THORPE,
H. E. PRICE.